(12) United States Patent
Smith et al.

(10) Patent No.: US 12,354,038 B1
(45) Date of Patent: Jul. 8, 2025

(54) APPARATUS AND METHODS FOR DETERMINING A RESOURCE GROWTH PATTERN

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/406,756

(22) Filed: Jan. 8, 2024

(51) Int. Cl.
   *G06Q 10/0631* (2023.01)

(52) U.S. Cl.
   CPC .............................. *G06Q 10/0631* (2013.01)

(58) Field of Classification Search
   CPC .................................................. G06Q 10/0631
   See application file for complete search history.

(56) References Cited

U.S. PATENT DOCUMENTS

| | | | |
|---|---|---|---|
| 8,346,588 B2 | 1/2013 | Baumer et al. | |
| 11,868,859 B1 | 1/2024 | Smith | |
| 2006/0017978 A1 | 1/2006 | Minamino et al. | |
| 2011/0158524 A1 | 6/2011 | Ohba et al. | |
| 2016/0321935 A1* | 11/2016 | Mohler | G09B 5/08 |
| 2017/0372225 A1 | 12/2017 | Foresti | |
| 2019/0108275 A1 | 4/2019 | Gulli et al. | |
| 2021/0241862 A1 | 8/2021 | Bhattacharya et al. | |
| 2021/0383261 A1 | 12/2021 | Hanna et al. | |
| 2022/0004964 A1 | 1/2022 | Essafi et al. | |
| 2022/0129988 A1* | 4/2022 | Faucher-Courchesne | G06N 20/00 |

(Continued)

FOREIGN PATENT DOCUMENTS

| | | |
|---|---|---|
| CN | 113570481 A | 10/2021 |
| KR | 10-2015-0053317 A | 5/2015 |
| WO | 2021/031336 A1 | 2/2021 |

OTHER PUBLICATIONS

Khanbabaei, "Applying clustering and classification data mining techniques for competitive and knowledge-intensive processes improvement," 2019, Knowledge and Process Management, vol. 26, pp. 123-129 (Year: 2019).

*Primary Examiner* — Deirdre D Hatcher
(74) *Attorney, Agent, or Firm* — Caldwell Intellectual Property Law

(57) ABSTRACT

An apparatus and methods for predicting a resource growth pattern are provided. The apparatus comprises a processor and a memory connected to the processor. The memory contains instructions configuring the processor to receive a datum, where the datum describes a prioritization value of a first activity pattern relative to a second activity pattern. The processor may classify the datum to a label selected from multiple labels based on the prioritization value. Classifying includes generating a representation of the datum in a first space having a first number of dimensions using a first machine-learning process and projecting the representation of the datum to a second space having a second number of dimensions using a second machine-learning process to result in a projected representation of a second number of dimensions describing an object sequence. The processor may generate an interface query data structure to at least display the resource growth pattern.

20 Claims, 9 Drawing Sheets

(56) References Cited

U.S. PATENT DOCUMENTS

| | | |
|---|---|---|
| 2022/0245557 A1 | 8/2022 | Minter et al. |
| 2022/0374812 A1 | 11/2022 | Riedl |
| 2023/0036730 A1 | 2/2023 | Casa |
| 2024/0242619 A1* | 7/2024 | Bowler .................... G09B 5/02 |

* cited by examiner

Next 25 Years' Freedom

| | 10x Time | 10x Money | 10x Interpersonal Relationships | 10x Purpose |
|---|---|---|---|---|
| Activity Modifications | How you have permanently transformed your Freedom of Time for the next 25 years? | How you have permanently transformed your Freedom of Money for the next 25 years? | How you have transformed your Freedom of Relationship for the next 25 years? | How you have permanently transformed your Freedom of Purpose for the next 25 years? |
| 1 | 30% increase in productivity and creativity because of decreased travel. | Complete transformation of Back Stage teamwork by using Zoom. | Creation of hundreds of new virtual "connection" workshops multiplying our between-quarter contact. | Established "$15-Trillion Free Zone" with quarterly book creating 25-year goal and measurements. |
| 2 | Using Fast Filter to think through all projects days and weeks ahead. | Virtual marketing, sales, and coaching cutting costs by 30% for existing program. 204C | Intro of "Who Not How." | Established Value Creation Growth Levels for 25-year program structure. |
| 3 | Bestselling "Who Not How" book because of 100x collaboration with Ben, Tucker, and Hay House. | Creation of entirely new "Global Virtual" program contributing to rapid growth of worldwide clientele. | Creation of new 'Who not How' intro sessions.    *212C* | Increased "bump-ups" from business inception 10x to Free Zone. 208C |
| Insights for Discussion | The necessary switch, both Back Stage and Front Stage, to virtual teamwork and coaching is the single biggest game changer is company history. | Our 31 years of basing all company growth on Unique Ability Teamwork enabled remarkable fast adjustment to entirely new future approach. | A full year of mastering Zoom by everyone in the company will easily increase productivity and innovation by 25% over the next 25 years. | |

APPARATUS AND METHODS FOR DETERMINING A RESOURCE GROWTH PATTERN

FIELD OF THE INVENTION

The present invention generally relates to the field of artificial intelligence (AI). In particular, the present invention is directed to an apparatus and methods for determining a resource growth pattern.

BACKGROUND

Recent increases in computational efficiency have enabled iterative analysis of data describing complex phenomena; however, such data are only valuable inasmuch they accurately represent the phenomena in question and may fail for lack of systems to correctly identify a degree of inaccuracy in the analysis itself. Prior programmatic attempts to resolve these and other related issues have suffered from inadequate user-provided data intake and subsequent processing capabilities.

SUMMARY OF THE DISCLOSURE

In an aspect, an apparatus for predicting a resource growth pattern is provided. The apparatus includes at least a processor and a memory connected to the processor. The memory contains instructions configuring the at least a processor to receive a first datum from a user device, wherein the first datum describes a first activity pattern of the user device, receive a second datum from a client device, wherein the second datum describes a second activity pattern of the user device, and receive a third datum from a database communicatively connected to the processor, wherein the third datum describes a prioritization value of the first activity pattern relative to the second activity pattern. Accordingly, the processor may classify at least the third datum to a label selected from a plurality of labels based on the prioritization value. Classifying includes generating a representation of the third datum in a first space having a first number of dimensions, where generating at least the representation comprises using a first machine-learning process, and projecting the representation of the third datum to a second space having a second number of dimensions, where projecting at least the representation comprises using a second machine-learning process and results in a projected representation of a second number of dimensions. In addition, the processor may generate an interface query data structure including an input field, where the interface query data structure configures a remote display device to display the input field, receive at least a user-input datum into the input field, wherein the user-input datum describes updating the prioritization value, and display the resource growth pattern including displaying the projected representation based on the user-input datum.

In another aspect, a method for determining a resource distribution is provided. The method includes receiving, by a computing device, a first datum from a user device, wherein the first datum describes a first activity pattern of the user device, receiving, by the computing device, a second datum from a client device, wherein the second datum describes a second activity pattern of the user device, and receiving, by the computing device, a third datum from a database communicatively connected to the computing device, wherein the third datum describes a prioritization value of the first activity pattern relative to the second activity pattern. The method includes classifying, by the computing device, at least the third datum to a label selected from a plurality of labels based on the prioritization value, wherein classifying further includes generating a representation of the third datum in a first space having a first number of dimensions, where generating at least the representation comprises using a first machine-learning process, and projecting the representation of the third datum to a second space having a second number of dimensions, where projecting at least the representation comprises using a second machine-learning process and results in a projected representation of a second number of dimensions. In addition, the method includes generating, by the computing device, an interface query data structure including an input field, where the interface query data structure configures a remote display device to display the input field, receive at least a user-input datum into the input field, wherein the user-input datum describes updating the prioritization value, and display the resource growth pattern including displaying the object sequence based on the user-input datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
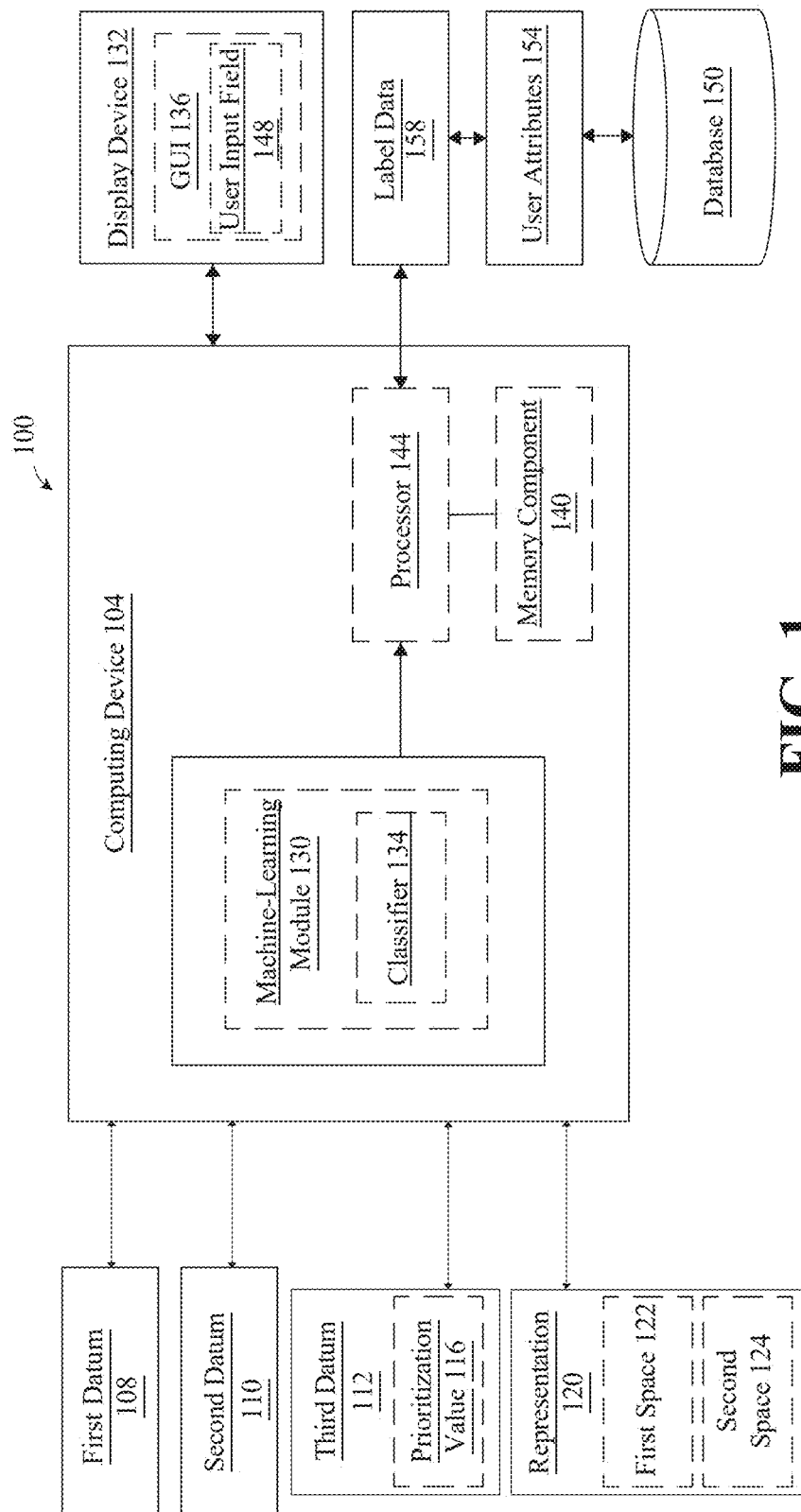
FIG. 1 is a block diagram of an embodiment of an apparatus for determining a resource distribution.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for predicting a resource growth pattern. Described processes are executed by a processor and a memory connected to the processor. The memory contains instructions configuring the at least a processor to receive a first datum from a user device, wherein the first datum describes a first activity pattern of the user device, receive a second datum from a client device, wherein the second datum describes a second activity pattern of the user device, and receive a third datum from a database communicatively connected to the processor, wherein the third datum describes a prioritization value of the first activity pattern relative to the second activity pattern. Accordingly, the processor may classify at least the third datum to a label selected from a plurality of labels based on the prioritization value. Classifying includes generating a representation of the third datum in a first space having a first number of dimensions, where generating at least the representation comprises using a first machine-learning process, and projecting the representation of the third datum to a second space having a second number of dimensions, where projecting at least the representation comprises using a second machine-learning process and results in a projected representation of a second number of dimensions.

"Resource growth pattern," as used herein, is data describing a scarce resource representative of value, such as money, monetary instruments including cash accounts held at brokerages, or other forms of investments, instruments, and/or securities, such as stock shares, equities, bonds, as well as real estate and/or trusts, etc. An "investment," as used herein and in the fields of finance, banking, and retirement planning, is an asset or item acquired with the goal of generating income or appreciation, which refers to an increase in the value of an asset over time. When an individual purchases a good as an investment, the intent is not to consume the good but rather to use it in the future to create wealth. An investment generally concerns the outlay of some scarce resource at a first point in time (such as today), including time, effort, money, or an asset, with the anticipation of a greater payoff in the future than what was originally put in. For example, an investor may purchase a monetary asset now with the idea that the asset will provide income in the future or will later be sold at a higher price for a profit. The resource growth pattern can track the growth of that asset over time to, for example, evaluate the performance of that asset against other options.

"Resource distribution," as used herein, is data describing an allocation of a resource, such as the resource tracked over time for growth, such as money or a monetary investment. In addition, or the alternative, such a resource may refer to time devoted to completion of a sequence of activities to a satisfactory level of completion. Given the time is a finite resource, time must be distributed and allocated to achieve certain objectives. For example, in the context of a weekly schedule, there are 24 hours in a day and 7 days in a week, for a total of 168 hours. Provided that people generally are recommended to get about 8 hours of sleep per night, that equates to about 112 remaining conscious hours. Of these conscious hours, people tend to spend their time across several general activities, each of which can be classified (as described below) to a label of multiple labels stored in a database communicatively connected to a processor configured to execute the described processes. Activity pattern may include: (1) leisure (e.g., hobbies, personal interests, sports, etc.); (2) income-generation (e.g., rendering professional services for payment, passive-income generation strategies, investment-derived income, etc.); (3) relationship development (e.g., interpersonal, romantic, networking, educational); and (4) objective development (e.g., short, or long-term professional goals, milestone setting, milestone achievement logging, incremental value creation, etc.). Persons without significant discretionary income often cannot devote significant quantities of their limited time-based resources to non-income generating activities, such as those enumerated in activity patterns (1), (3) and (4), potentially leading to an unfulfilling or otherwise unbalanced life experience.

Aspects of the present disclosure recognize that advances in computational efficiency have permitted for more demanding resource and activity progress tracking. Such progress tracking can now digitally monitor various forms of complex phenomena, ranging from sophisticated new business formation initiatives, merger, acquisition and divestiture activity, or interpersonal reflection relating to thoughts, opinions, or other perspectives, including allocation of a limited resource, such as time, as introduced above. More particularly, effective tracking of money growth over time can facilitate reallocation of time based on positive financial performance, potentially allowing for additional leisure time and the like. In addition, certain financial instruments can be selected for aggressive growth leading to additional potential available leisure time based on user preferences.

In addition, the memory contains instructions configuring the at least a processor to generate an "interface query data structure" including an input field based on ranking the first transfer datum and the second transfer datum. An "interface query data structure," as used in this disclosure, is an example of data structure used to "query," such as by digitally requesting, for data results from a database and/or for action on the data. "Data structure," in the field of computer science, is a data organization, management, and storage format that is usually chosen for efficient access to data. More particularly, a "data structure" is a collection of data values, the relationships among them, and the functions or operations that can be applied to the data. Data structures also provide a means to manage relatively large amounts of data efficiently for uses such as large databases and internet indexing services. Generally, efficient data structures are essential to designing efficient algorithms. Some formal design methods and programming languages emphasize data structures, rather than algorithms, as an essential organizing factor in software design. In addition, data structures can be used to organize the storage and retrieval of information stored in, for example, both main memory and secondary memory.

Therefore, "interface query data structure," as used herein, refers to, for example, a data organization format used to digitally request a data result or action on the data. In addition, the "interface query data structure" can be displayed on a display device, such as a digital peripheral, smartphone, or other similar device, etc. The interface query data structure may be generated based on received "user data," defined as including historical data of the user. Historical data may include attributes and facts about a user that are already publicly known or otherwise available, such as prior time allocations spent on certain activity patterns, such as leisure, education, income-generation, etc. In some embodiments, interface query data structure prompts may be generated by a machine-learning model. As a non-limiting example, the machine-learning model may receive user data and output interface query data structure queries.

Accordingly, as used herein, the processor may generate an interface query data structure including an input field, where the interface query data structure configures a remote display device to display the input field, receive at least a user-input datum into the input field, wherein the user-input datum describes updating the prioritization value, and display the resource growth pattern including displaying the projected representation based on the user-input datum.

Referring now to FIG. 1, an exemplary embodiment of apparatus 100 for providing a customized skill factor datum to a user. In one or more embodiments, apparatus 100 includes computing device 104, which may include without limitation a microcontroller, microprocessor (also referred to in this disclosure as a "processor"), digital signal processor (DSP) and/or system on a chip (SoC) as described in this disclosure. Computing device 104 may include a computer system with one or more processors (e.g., CPUs), a graphics processing unit (GPU), or any combination thereof. Computing device 104 may include a memory component, such as memory component 140, which may include a memory, such as a main memory and/or a static memory, as discussed further in this disclosure below. Computing device 104 may include a display component (e.g., display device 132, which may be positioned remotely relative to computing device 104), as discussed further below in the disclosure. In one or more embodiments, computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks, as described below, across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104A may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to receive at least an element of first datum 108, which may include data describing current preferences relating to achieving a target by the user. More particularly, a memory component 140 is connected to processor 144 and contains instructions configuring the first datum 108 from a user device. First datum describes a first activity pattern of the user device. A "First activity pattern," as used herein, is an element of data, a datum, or a collection of elements of data that describes how a user of computing device 104 elects to spend scarce resources, such as money and/or time. That is, returning to an example introduced earlier, activity patterns include data describing various labels, including: (1) leisure (e.g., hobbies, personal interests, sports, etc.); (2) income-generation (e.g., rendering professional services for payment, passive-income generation strategies, investment-derived income, etc.); (3) relationship development (e.g., interpersonal, romantic, networking, educational); and (4) objective development (e.g., short, or long-term professional goals, milestone setting, milestone achievement logging, incremental value creation, etc.).

Still referring to FIG. 1, in the context of money, in contemporary markets, money can include government-issued legal tender or fiat money, money substitutes, fiduciary media, or electronic cryptocurrencies. Accordingly, the first activity pattern may include data relating to money generation and/or consumption, in the form of spending for various purposes, including leisure (such as credit card spending), education, or other forms of professional growth or training. For example, the first activity pattern may include data regarding payments for university tuition. In addition, the first activity pattern may include data relating to purchase of financial instruments intended for short-term or long-term growth, such stocks, bonds, or other equities including real estate investment trusts.

With further reference to FIG. 1, in the context of leisure, the first activity pattern may include data tracking or describing an amount of time per day or per week spend on certain leisure activities, such as watching television programming, world, national, or local news, weather, or participating in sports, such as soccer, football, tennis, volleyball, golf, weightlifting, and the like. Leisure time can be tracked or described daily, such as 1 hour and 20 minutes spent weightlifting completing multiple sets, or weekly, such as attending the gym a total of 3 times per week, each time for one hour and twenty minutes, such as from 6:00 pm-7:20 pm on Monday, Wednesday, and Friday. In addition, or the alternative, the first activity pattern may describe income-generation behavior or effort, such as rendering professional services for compensation in, for example, the legal, medical, engineering, or business fields. In legal practice, certain projects, which may be referred to as "matters," may be billed on an hourly or flat-fee basis, capped at a certain pre-determined number of hours. Collectively, matters can be billed at about 40 required minimum hours per week, captured by the first activity pattern during normal business hours, such as from 9 am-5 pm. Additional time spent from 5 pm-8 pm can also describe additional income-generation behavior and described by the first activity pattern. Time spent on these example activities can be classified to a label stored in database 150 and/or resource allocation database 300, and thereby be used to determine a resource distribution. The resource, in this context, may be time, or leisure time more specifically, allowing for optimization and increases in efficiency in income generating behavior. That is, described processes may detect and suggest reallocation of scare time resources based on increases in efficiency in income-generating activities, such as working, to increase leisure without reducing income generated from working. This may occur through a variety of allocation and reallocation techniques and suggestions generated using classifier 134 of machine-learning module 130 to be described further herein.

In some embodiments, and still referring to FIG. 1, first datum 108 may be input into computing device 104 manually by the client, who may be associated with any type or form of establishment (e.g., a business, university, non-profit, charity, etc.), or may be an independent entity (e.g., a solo proprietor, an athlete, an artist, etc.). In some instances, first datum 108 may be extracted from a business profile, such as that may be available via the Internet on LinkedIn®, a business and employment-focused social media platform that works through websites and mobile apps owned my Microsoft® Corp., of Redmond, WA). More particularly, such a business profile may include the past achievements of a user in various fields such as business, finance, and personal, depending on one or more related circumstances. Persons skilled in the art, upon reviewing the entirety of this disclosure, will be aware of various other ways or situations in which first datum 108 may be input, generated, or extracted for various situations and goals. For example, in an example where the client is a business, first datum 108 may be extracted from or otherwise be based on the client's business profile, which may include various business records such as financial records, inventory record, sales records, and the like. In addition, in one or more embodiments, first datum 108 may be generated by evaluating interactions with external entities, such as third parties. More particularly, in a business-related context, such an example external entity (or third party) may be that offered by Moody's Investors Services, Inc., Moody's Analytics, Inc. and/or their respective affiliates and licensors, of New York, NY. That is, business strategy consulting, legal, or other related ancillary professional services, such as accounting, provided on a time-based basis, such as hourly, may be assessed for effectiveness in the aggregate based on such third-party assessments. For example, a positive rating may indicate that a combination of a company's in-house legal counsel and outside law firm counsel are collectively achieving business objectives in a timely and favorable manner as viewed by investors and/or the public stock markets in general. Services rendered may include providing international financial research on bonds issued by commercial and government entities, including ranking the creditworthiness of borrowers using a standardized ratings scale which measures expected investor loss in the event of default. In such an example, first datum 108 extracted from such an external entity may include ratings for debt securities in several bond market segments, including government, municipal and corporate bonds, as well as various managed investments such as money market funds and fixed-income funds and financial institutions including banks and non-bank finance companies and asset classes in structured finance.

In addition, and with continued reference to FIG. 1 in one or more embodiments, first datum 108 may be acquired using web trackers, webcrawlers, or data scrapers. As used herein, "web trackers" are scripts (e.g., programs or sequences of instructions that are interpreted or carried out by another program rather than by a computer) on websites designed to derive data points about user preferences; such programs and/or suites of programs may, for instance, locate pages and/or network locations that include data pertaining to a subject of inquiry, such as a user, and then traverse a data structure at such a location, such as without limitation a document object model, and copy or extract textual and/or image data pertaining to the subject of interest-such data may be transmitted to apparatus. In some embodiments, such web trackers may track activity of the user on the Internet. Also, as used herein, "data scrapers" are computer programs that extract data from human-readable output coming from another program. For example, data scrapers may be programmed to gather data on user from user's social media profiles, personal websites, and the like. In some embodiments, first datum 108 may be numerically quantified (e.g., by data describing discrete real integer values, such as 1, 2, 3 . . . n, where n=a user-defined or prior programmed maximum value entry, such as 10, where lower values denote lesser significance relating to favorable business operation and higher values denote greater significance relating to favorable business operation). For example, for classifying at least an element describing a pattern of first datum 108 (e.g., of a business) to third datum 112 in the context of fiscal integrity in financial services and retirement planning, first datum 108 may equal "3" for a business, such as an investment bank stock or mutual fund share, etc., suffering from credit liquidity problems stemming from a rapidly deteriorating macroeconomic environment and/or poor quality senior management, a "5" for only matching industry peers, and an "8" for significantly outperforming industry peers, etc.

Still referring to FIG. 1, other example values for first datum 108 are possible along with other exemplary attributes and facts about a system (e.g., a business entity, or an aspiring athlete) that may already be known and may be tailored to a particular situation where explicit money growth guidance (e.g., provided by the described resource growth pattern) is sought. For example, in one or more alternative embodiments, first datum 108 may be described by data organized in or represented by lattices, grids, vectors, etc., and may be adjusted or selected as necessary to accommodate system-defined circumstances or any other format or structure for use as a calculative value that a person skilled in the art would recognize as suitable upon review of the entirety of this disclosure.

In one or more embodiments, and with continued reference to FIG. 1, first datum 108 may be provided to or received by computing device 104 using various means. In one or more embodiments, first datum 108 may be provided to computing device 104 by a business, such as by a human authorized to act on behalf of the business including any type of executive officer, an authorized data entry specialist or other type of related professional, or other authorized person or digital entity (e.g., software package communicatively coupled with a database storing relevant information) that is interested in improving and/or optimizing performance of the business overall, or in a particular area or field over a defined duration, such as a quarter or six months. In some examples, a human may manually enter first datum 108 into computing device 104 using, for example, user input field 148 of graphical user interface (GUI) 136 of display device 132; GUI may include, be included in, and/or interact with an interface data structure as described in further detail below. For example, and without limitation, a human may use display device 132 to navigate the GUI 136 and provide first datum 108 to computing device 104. Non-limiting exemplary input devices include keyboards, joy sticks, light pens, tracker balls, scanners, tablet, microphones, mouses, switches, buttons, sliders, touchscreens, and the like. In other embodiments, first datum 108 may be provided to computing device 104 by a database over a network from, for example, a network-based platform. First datum 108 may be stored, in one or more embodiments, in database 150 and communicated to computing device 104 upon a retrieval request from a human and/or other digital device (not shown in FIG. 1) communicatively connected with computing device 104. In other embodiments, first datum 108 may be communicated from a third-party application, such as from a third-party application on a third-party server, using a network. For example, first datum 108 may be downloaded from a hosting website for a particular area, such as a networking group for small business owners in a certain city, or for a planning group for developing new products to meet changing client expectations, or for performance improvement relating to increasing business throughput volume and profit margins for any type of business, ranging from smaller start-ups to larger organizations that are functioning enterprises. In one or more embodiments, computing device 104 may extract first datum 108 from an accumulation of information provided by database 150. For instance, and without limitation, computing device 104 may extract needed information database 150 regarding improvement in a particular area sought-after by the business and avoid taking any information determined to be unnecessary. This may be performed by computing device 104 using a machine-learning model, which is described in this disclosure further below.

At a high level, and still referring to FIG. 1, "machine-learning" describes a field of inquiry devoted to understanding and building methods that "learn"—that is, methods that leverage data to improve performance on some set of defined tasks. Machine-learning algorithms may build a machine-learning model based on sample data, known as "training data," to make predictions or decisions without being explicitly programmed to do so. Such algorithms may function by making data-driven predictions or decisions by building a mathematical model from input data. These input data used to build the machine-learning model may be divided into multiple data sets. In one or more embodiments, three data sets may be used in different stages of the creation of the machine-learning model: training, validation, and test sets.

With continued reference to FIG. 1, described machine-learning models may be initially fit on a training data set, which is a set of examples used to fit parameters. Here, example training data sets suitable for preparing and/or training described machine-learning processes may include data relating to historic business operations under historic circumstances, or circumstances in certain enumerated scenarios, such as during a period low interest rates or relatively easy bank lending, or during a period of highly restrictive fiscal policy implemented to control and address undesirably high inflation. Such training sets may be correlated to similar training sets of user attributes 154 relating to attributes of the user. In the described example of first datum 108 relating to a business, user attributes 154 may describe one or more elements, datum, data and/or attributes relating to client engagement with services provided by the user. For example, a business may require financing to launch and can approach a bank (e.g., a type of user) for one or more types of loans. In this example, user attributes 154 may describe or relate to data describing retail, regional, or even investment banks. In addition, user attributes may include data describing liquidity available to customers (e.g., clients) and performance of outstanding loans and other products. In addition, first datum 108 may include data describing a pattern of activity or conduct undertaken by the client regarding acquisition of goods or services from the user, depending on, for example, repayment behavior of the client to the user for services rendered by the user to the client. In banking, that may mean that the client will assess risk in relatively difficult macroeconomic conditions as dictated by higher-than-average federal interest rates, etc.

Still referring to FIG. 1, in one or more embodiments, computing device 104 is configured to receive at least an element of second datum 110. Second datum describes a second activity pattern, which may include any data suitable for use as a first activity pattern as described above. That is, the second activity pattern may include data describing a sequence of money generation or consumption related activities other than that described by the first activity pattern. In the example provided earlier, should the first activity pattern describe money resources devoted toward income-generation, then the second activity pattern may describe money resources devoted to leisure, or vice-versa. In addition, or the alternative, the second activity pattern may describe time-based efforts spent daily, or weekly, or on some other defined interval devoted towards relationship-building, whether that may entail interpersonal relationships, new friendships, participation in activity groups such as that related to hiking, camping, etc., or romantic relationships, such as dating. Such efforts may be optimized, referred to as being changed or altered to achieve a desired purpose or objective of the user, over a defined time as to be described further herein.

Further referring to FIG. 1, in one or more embodiments, memory component 140 connected to processor 144 contains instructions configuring processor 144 to receive third datum 112 from database 150 communicatively connected to processor 144. Third datum 112 describes prioritization value 116 of the first activity pattern relative to the second activity pattern for adjusting at least the first activity pattern to match representation 120, which, as used herein and in the fields of computer science and data science, refer to the form in which data is stored, processed, and transmitted. Third datum describes a requested, desired, or otherwise ideal scarce resource allocation. In some embodiments, third datum 112 may be sourced from the user device or another computing device (not shown in FIG. 1) that is communicatively coupled with computing device 104. In addition, in some embodiments, processor may generate third datum; generating the third datum may include retrieving data describing current preferences of the user device between a minimum value and a maximum value, for instance and without limitation from database 150 communicatively connected to processor 144, where retrieving data further comprises receiving at least a "form element" input into the input field. The "form element," also referred to as a "<form> element" is a container for different types of input elements, such as: text fields, checkboxes, radio buttons, submit buttons, etc.

Still referring to FIG. 1, returning to the example provided earlier of the resource being money, the first activity pattern may describe money devoted to increasing income-generating activities and the second activity pattern may describe money devoted to increasing leisure. The exact distribution of money required for furthering one's education, earning capabilities, working efficiency, and other duties such as money required for caring for minor children, socializing with friends, financial planning for the future, and other pursuits such as learning a foreign language and the like notwithstanding may be set by a user of computing device 104, such as by manual entry or through touch-screen entry by the user into computing device 104. Individual preferences between work and leisure activities, or other time-demanding pursuits such as relationships or long-term objectives, etc., are captured by prioritization value 116. That is, as used herein, "prioritization value" describes an element, datum, or data indicative of the relative preference of money allocated to pursuit of a sequence of, for example, the first activity pattern over the second activity pattern, each activity pattern describing activities distinct from one another. For example, as described earlier, younger persons entering the workforce may prioritize work over leisure, whereas older persons transitioning towards retirement may seek the opposite. These preferences, and others like them, are captured and reflected by prioritization value 116.

With continued reference to FIG. 1, accordingly, memory component 140 may contain instructions configuring processor 144 to classify at least a first datum 108, second datum 110 and third datum 112 to a label selected from labels based on prioritization value 116. This may be performed using a classifier, which may be implemented in any manner described in this disclosure. Classifier may be trained, without limitation, using training data and/or training examples correlating exemplary data pertaining to first datum 108, second datum 110 and third datum 112 to exemplary data pertaining to labels; such training data may be entered and/or labeled by users, as a non-limiting example. Classifying, as performed by classifier 134 of machine-learning module 130, includes modifying a sequence of activities in the first activity pattern, and adjusting at least the second activity pattern based on modification of first activity pattern. Modification of the sequence of activities of the first pattern may be performed to match the prioritization value more accurately or closely. For example, should prioritization value 116 indicate prioritization of income-generation, the classification may include generating the resource distribution to indicate, via display device 132 to a user, allocation of working hours, potentially also encroaching into early morning, evening, and weekend hours if necessary to achieve certain money-generation related targets (e.g., 70+ hours a week). That is, more particularly, "labels," as used herein, are datum, elements, or data describing discrete categorizations of activity patterns, such as leisure label 304, income-generation label 308, relationship label 312, and purpose label 316 of resource allocation database 300, which may be one example of database 150 of FIG. 1. Classification is described further herein and may include predictive modeling involving assigning, by classifier 134, a class label to input examples, using binary classification, which refers to predicting one of two classes, or multi-class classification, which involves predicting one of more than two classes.

Multi-label classification involves predicting one or more classes for each example and imbalanced classification refers to classification tasks where the distribution of examples across the classes is not equal. That is, first datum 108, when describing to income-generating activities, may be classified to income-generation label 308 by classifier 134 and second datum 110, when describing leisure-related activities, may be classified to leisure label 304, and so on, etc. In some embodiments, classifier 134 may further prioritize income-generation label 308 over leisure label 304 based on prioritization value 116, if prioritization value 116 describes such preferences and/or data, etc. In addition, in one or more embodiments, memory component 140 may include instructions configuring processor 144 to generate an interface query data structure including user input field 148, where the interface query data structure configures display device 132 to display user input field 148 and receive at least user-input datum 224A into user input field 148, where user-input datum describes data for updating prioritization value 116. That is, user preferences for money allocations devoted to various activities may change over time based on, for example, response to external stimuli such as increases in income provided by job promotions, changes in romantic relationship status from being single to getting married, and so on. Accordingly, user-input datum 224A provides for iterative updating of the described processes to maintain relevancy for the user over various transformative external stimuli or circumstances.

In addition, in some embodiments, memory component 140 connected to processor 144 may contain instructions configuring classifier 134 of processor 144 to classify at least third datum 112 to a label selected from a plurality of labels (such as from label data 158 and/or as stored in resource allocation database 300, which may be one example of database 150) based on prioritization value 116. Classifying includes generating representation 120 of third datum 112 in first space 122 having a first number of dimensions, where generating representation 120 comprises using a first machine-learning process, such as any one or more processes selected from those disclosed herein. In addition, classifying includes projecting representation 120 of third datum 112 to second space 124 having a second number of "dimensions", where "projecting" at least the representation comprises using a second machine-learning process, such as any one or more processes selected from those disclosed herein, and results in a projected representation of a second number of dimensions.

"Representation," or "data representation," as used herein and in the field of computer science, refers to a form in which data is stored, processed, and transmitted. For the purposes of this disclosure, a "representation" is a presentation of data or information. For instance, and without limitation, representation may include a presentation or population of information related to an area of interest of the user. In one or more embodiments, first space 122 may include a first number of dimensions, where dimensions are a minimum number of coordinates needed to define elements in a space and/or a minimum number of vectors needed to span that space.

In one or more embodiments, computing device and/or processor may generate representation in a first space 122 using a machine-learning model. In some cases, computing device 104 and/or processor may generate representation in first space 122 as a function of third datum. Representation machine-learning model may include any machine-learning process described in this disclosure, including those described below. In some cases, representation machine-learning model may include a neural network, such as neural networks described in this disclosure, for example with reference to. Machine-learning model may be configured to map third data to one or more points in first space, for instance by computing a degree of similarity between each data point of third data and generating points and/or vectors in space that are separated from one another by a distance metric according to the degree of similarity.

Still referring to FIG. 1, generating representation may include selecting a number of dimensions, such as a first quantity of dimensions or a second quantity of dimensions. In one or more embodiments, a mapping machine-learning process may be used to map user data to vectors and/or points. Each vector may include an element corresponding to each dimension. In one or more embodiments, mapping machine-learning model may be generated using mapping training data. Mapping training data may include inputs that are correlated to outputs, such as a plurality of vector element inputs correlated to a plurality of dimension outputs.

With continued reference to FIG. 1, mapping machine-learning model may create output vectors to represent the number of dimensions based on the domain targets and/or user data. A "vector" as defined in this disclosure is a data structure that represents one or more a quantitative values and/or measures a number of dimensions based off of domain targets. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes.

Still referring to FIG. 1, in some embodiments, representation machine-learning model may receive inputs, such as user data, and output representation in first space 122, which includes first quantity of dimensions. More specifically, in one or more embodiments, representation machine-learning model 140 may receive input including one or more of at least a domain target 124a-n and scheduling data 112. As used in this disclosure, a "representation machine-learning model" is a machine-learning process that that takes as input third data and generates as output representation in first space. In one or more embodiments, apparatus 100 may generate representation 136 as a function of representation machine-learning model. In some embodiments, apparatus 100 may train representation machine-learning model. In some cases, training representation machine-learning model may include inputting representation training data to a machine learning algorithm. In one or more embodiments, representation training data may be manually provided, for example, by a domain expert or the user. In some cases, representation training data may be derived from publications associated with a particular domain. In other embodiments, training data may include previous inputs and outputs of representation machine-learning model, where initial inputs and outputs of representation machine-learning model are used as updated training data to generate an updated representation machine-learning model. This may be continuously and iteratively done so that representation machine-learning model may be continuously and iteratively updated. Machine learning algorithm may include any machine learning algorithm described in this disclosure.

"Projecting," as used herein, is an idempotent mapping of a set into a subset, where one or more operations may be applied a plurality of times without altering a result beyond the initial application of the operations. For instance, and without limitation, projecting may include projecting from three dimensions onto two dimensions in a manner analogous to casting a silhouette with a light source and an object. Projection may include dropping orthogonal lines from vector endpoints onto subspace. Projection may be performed, without limitation, by selection of second space. Second space may be selected using a machine-learning process. In one or more embodiments, projecting a representation to a space, such as first or second space, may include dimensionality reduction. "Dimensionality reduction," for the purposes of this disclosure, may include a transformation of data or information from a high-dimensional space to a low-dimensional space. For example, and without limitation, an object having data representation in three dimensions (e.g., volume) may be reduced to a two-dimensional object having data representation in two dimensions (e.g., area) in a projection. The reduction in dimensionality may reduce cumbersome data analysis. Dimensionality reduction may include, and without limitation, feature selection, where feature selection includes determining a subset of input variable (e.g., attributes). In other embodiments, dimensionality reduction may include feature projection, where feature projection includes data transformations using linear or nonlinear approaches. dimensionality reduction may be performed prior to applying K-nearest neighbors algorithm, as described further in this disclosure. In non-limiting embodiments, projection may include a visual projection such as a parallel projection, such as an orthographic projection, oblique projection, axonometric projection, and so on, where a perspective of a visual representation is altered based on lines of sight from the object to the projection plane that are parallel to each other. In other non-limiting embodiments, projections may include perspective projections, where the perspective projection includes a nonlinear projection (e.g., foreground versus background).

Still referring to FIG. 1, in addition, in one or more embodiments, the interface query data structure configures a display device 132 to display the resource distribution (e.g., hourly time allocation devoted to various activity patterns per week) including displaying an updated prioritization value based on user-input datum 224A and/or to retrieve data describing attributes of a user from a database communicatively connected to the processor. In addition, in some embodiments, the interface query data structure configures a display device 132 to display a representation of at least a first label and a second label selected from a plurality of labels in a grid (not shown in FIG. 1).

Figure 2:
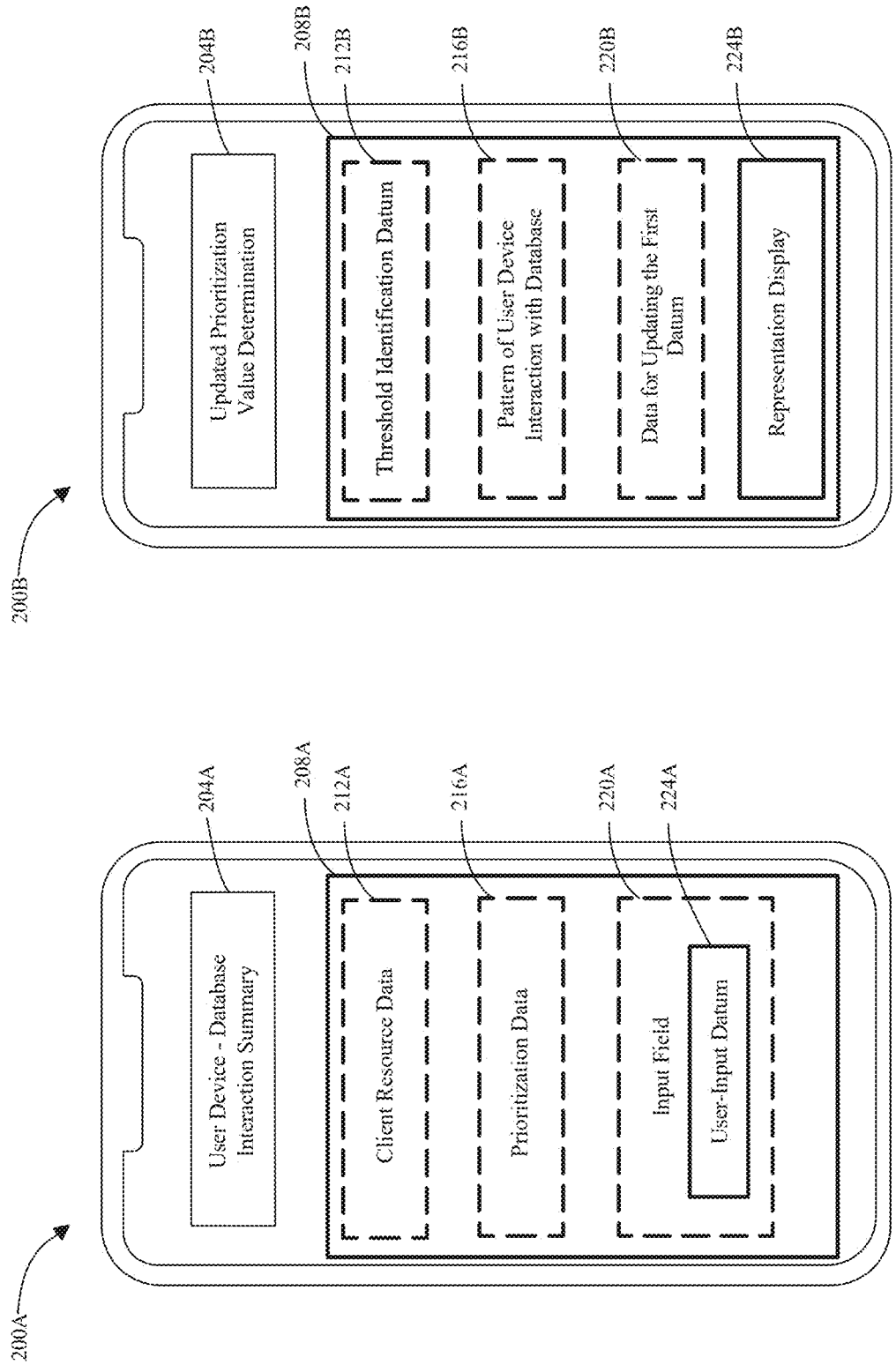
FIGS. 2A-2B are diagrammatic representations of multiple exemplary embodiments of output generated by an interface query data structure.
FIG. 2C is an example display screen of output generated by the interface query data structure of FIGS. 2A-2B.

In addition, in some embodiments, generating the interface query data structure is based on the data describing attributes of the user, where generating the interface query data structure includes determining at least vector 212C of FIG. 2C from a visual representation (e.g., display screen 200C) of at least first label 204C to second label 208C, and configuring display device 132 to display vector 212C. More particularly, determining vector from 212C from at least first label 204C to second label 208C includes generating the vector including an angle value and a distance value, where the angle value and the distance value describe at least a "divergence value" between first datum 108 and second datum 110. As used herein, and in the field of computer science, a computation is said to diverge if it does not terminate or terminates in an exceptional state. Otherwise, it is said to converge. In domains where computations are expected to be infinite, such as process calculi, a computation is said to diverge if it fails to be productive (e.g., to continue producing an action within a finite amount of time). Here, the first datum 108 describes phenomena dissimilar to the second datum 110, thereby facilitating calculation of the described "divergence" value. In some instances, the interface query data structure configures display device 132 to generate at least an additional input field based on the divergence value, which describes divergence between the first datum and the second datum.

In addition, in some embodiments, classifying at least an instance of first datum 108 to third datum 112 includes determining a "proximity" of a respective first datum 108 to third datum 112 based on the sequence of activities in the first activity pattern, and adjusting the third datum to reduce the proximity. As used herein, and in the fields of computer science and data science, the term "proximity" between two objects is a function of the proximity between the corresponding attributes of the two objects. Proximity measures refer to measures of similarity and dissimilarity, which may be relevant because they are used by several data mining techniques, such as clustering, nearest neighbor classification, and anomaly detection.

Still referring to FIG. 1, classifying second datum 110 to third datum 112, where classifying second datum 110 includes comparing second datum 110 to third datum 112, and determining a parity value based on comparison of second datum 110 to third datum 112, wherein the parity value is included within the resource distribution. As used herein, and the fields of computer science and data science, parity (from the Latin "paritas," meaning equal or equivalent) is analytical technique that checks whether data has been lost or written over when it is moved from one place in storage to another or when it is transmitted between computers. Since data transmission may not be an entirely error-free process, data may not always be received in the same way as it was transmitted. A parity bit adds "checksums," which are small-sized blocks of data derived from another block of digital data for the purpose of detecting errors that may have been introduced during its transmission or storage, into data that enable the target device to determine whether the data was received correctly. An additional binary digit, the parity bit, may be added to a group of bits that are moved together. This bit, sometimes referred to as a check bit, is used only to identify whether the moved bits arrived successfully.

Still further, in some embodiments, the memory contains instructions configuring processor 144 to determine a "pattern," where the pattern describes user interaction with the database. A "pattern," also referred to as "pattern recognition," as used herein and in the fields of computer science and data science, is a part of computational analysis and refers to a process of identifying patterns in a data set to categorize, process and resolve information more effectively. Patterns are pieces or sequences of data that have one or multiple similarities. Accordingly, processor 144 may classify at least an element of the pattern to the divergence value, and adjust the pattern based on a "magnitude" of the divergence value. As used herein, and in the fields of computer science and data science, "magnitude," alternatively referred to as "sign magnitude," is defined as follows a number's representation in sign magnitude has the same number of bits as the original number, plus a bit called the sign bit on the extreme left (the MSB). The sign bit denotes that the number is negative if it is set to 1 and the number is positive if it is set to 0.

Still further, in some embodiments, the memory contains instructions configuring processor 144 to evaluate user-input datum 224A including classifying one or more new instances of user-input datum 224A to at least third datum 112, generating at least a divergence value based on the classification; and displaying the at least a divergence value hierarchically based on magnitude of divergence. In addition, classifying first datum 108 to a label may include organizing at least some labels based on their respective proximity to a minimal output type and a maximum output type; aggregating at least an instance of the first datum based on the classification; and classifying aggregated first data to the label having a closest proximity to the maximum output type.

Accordingly, described concepts relating to classification of data for determining a resource distribution, can be quantified by one or more elements, datum or data and thereby processed by "machine-learning processes" executed by machine-learning module 130 of computing device 104 to, for example, be evaluated prior to display of multiple instances of third datum 112 (e.g., a first transfer datum and at least a second transfer datum, each respectively describing, for a payment) hierarchically based on at least user-input datum 224A in user input field 148. More particularly, and as described further herein with relation to FIG. 4, a "machine-learning process," as used in this disclosure, is a process that automatedly uses training data to generate an algorithm that will be performed by a computing device/module (e.g., computing device 104 of FIG. 1) to produce outputs given data provided as inputs. Any machine-learning process described in this disclosure may be executed by machine-learning module 130 of computing device 104 to manipulate and/or process third datum 112 relating to describing instances or characteristics of confidence for the user.

"Training data," as used herein, is data containing correlations that a machine-learning process may use to model relationships between two or more categories of data elements. For instance, and without limitation, training data, in this instance, may include multiple data entries, each entry representing a set of data elements that were recorded, received, and/or generated together and described various confidence levels or traits relating to demonstrations of confidence. Data elements may be correlated by shared existence in each data entry, by proximity in a given data entry, or the like. Multiple categories of data elements may be related in training data according to various correlations, which may indicate causative and/or predictive links between categories of data elements, which may be modeled as relationships such as mathematical relationships by machine-learning processes as described in further detail below. In addition, training data may be formatted and/or organized by categories of data elements, for instance by associating data elements with one or more descriptors corresponding to categories of data elements.

For instance, a supervised learning algorithm (or any other machine-learning algorithm described herein) may include one or more instances of third datum 112 describing confidence of a user as described above as inputs. Accordingly, computing device 104 of FIG. 1 may receive user-input datum 224A into input field 148 of display device 132. User-input datum 224A may describe data for updating prioritization value 116 that is at least initially described by, for example third datum 112. In addition, in some embodiments, either the user or a third-party may dictate third datum 112 by inputting third datum 112 into computing device 104. Classifier 134 of machine-learning module 130 may classify one or more instances of third datum 112 relative to, for example, third datum 112 (e.g., also in the context of confidence, such as achieving an optimum confidence level). Accordingly, in some embodiments, classifier 134 may classify instances of third datum 112 that more closely relate to or resemble representation 120 within a closer proximity to representation 120.

Still referring to FIG. 1, in some embodiments, a scoring function representing a desired form of relationship to be detected between inputs and outputs may be used by described machine learning processes. Such as scoring function may, for instance, seek to maximize the probability that a given input (e.g., data describing a first activity pattern of the user device) and/or combination of elements and/or inputs (e.g., prioritization value 116 of the first activity pattern relative to the second activity pattern for adjusting at least the first activity pattern to match representation 120) is associated with a given output (e.g., hierarchical display of multiple instances of third datum 112 describing confidence) to minimize the probability that a given input (e.g., where the first activity pattern indicates an interest in maximizing, for example, working hours per week) is not associated with a given undesirable output (e.g., prioritization of leisure over working hours).

Still further, described processes executed by machine-learning module 130 of computing device 104 may generate an output (e.g., the described instruction set and/or as probability datum display 224B) inclusive of a text and/or digital media-based content describing a strategy recommendation as a function of, for example, third datum 112, first datum 108, second datum 110, where the strategy recommendation may include displaying the resource distribution including displaying updated prioritization value 116 based on user-input datum 224A.

In some instances, in one or more embodiments, computing device 104 is configured to receive at least an element of third datum 112. In addition, or the alternative, computing device 104 is configured to receive one or more instances of an "outlier cluster," as used for methods described in U.S. patent application Ser. No. 18/141,320, filed on Apr. 28, 2023, titled "METHOD AND AN APPARATUS FOR ROUTINE IMPROVEMENT FOR AN ENTITY," and, U.S. patent application Ser. No. 18/141,296, filed on Apr. 28, 2023, titled "SYSTEMS AND METHODS FOR DATA STRUCTURE GENERATION BASED ON OUTLIER CLUSTERING," both of which are incorporated herein by reference herein in their respective entireties. Accordingly, in this example, third datum 112 may be determined or identified using one or more outlier clusters. More particularly, described machine-learning processes may use, as inputs, one or more instances of first datum 108, second datum 110, third datum 112, and/or representation 120 in combination with the other data described herein, and use one or more associated outlier cluster elements with target outputs, such as probability datum display 224B. As a result, in some instances, classifier 134 may classify inputs to target outputs including associated outlier cluster elements to generate probability datum display 224B.

In addition, and without limitation, in some cases, database 150 may be local to computing device 104. In another example, and without limitation, database 150 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 150. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Database 150 may include keywords. As used in this disclosure, a "keyword" is an element of word or syntax used to identify and/or match elements to each other. For example, without limitation, a keyword may be "income-generation" in the instance that a suer is seeking to increase income. In another non-limiting example, keywords of a key-phrase may be "leisure" in an example where the user is seeking to increase leisure-related activities and the like. Database 150 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1, a "classifier," as used in this disclosure is type or operational sub-unit of any described machine-learning model or process executed by machine-learning module 130, such as a mathematical model, neural net, or program generated by a machine-learning algorithm known as a "classification algorithm" that distributes inputs into categories or bins of data, out-putting the categories or bins of data and/or labels associated therewith. A classifier may be configured to classify and/or output at least a datum (e.g., one or more instances of any one or more of first datum 108, second datum 110, third datum 112, and/or third datum 112 as well as other elements of data produced, stored, categorized, aggregated or otherwise manipulated by the described processes) that labels or otherwise identifies a set of data that are clustered together, found to be close under a distance metric, or the like.

Referring again to FIG. 1, computing device 104 may be configured to identifying business impact by using classifier 134 to classify one or more instances of any one or more of first datum 108, second datum 110, third datum 112, and/or third datum 112 based on user attributes 154 and/or label data 158. Accordingly, classifier 134 of machine-learning module 130 may classify attributes within user attributes 154 related to modifying a sequence of activities in the first activity pattern and adjusting at least the second activity pattern based on modification of the first activity pattern.

In addition, in some embodiments, machine-learning module 130 performing the described correlations may be supervised. Alternatively, in other embodiments, machine-learning module 130 performing the described correlations may be unsupervised. In addition, classifier 134 may label various data (e.g., one or more instances of any one or more of first datum 108, second datum 110, third datum 112, and/or third datum 112 as well as other elements of data produced, stored, categorized, aggregated, or otherwise manipulated by the described processes) using machine-learning module 130. For example, machine-learning module 130 may label certain relevant parameters of one or more instances of first datum 108 with parameters of one or more user attributes 154.

In addition, machine-learning processes performed by machine-learning module 130 may be trained using one or more instances of label data 158 to, for example, more heavily weigh or consider instances of label data 158 deemed to be more relevant to the business. More specifically, in one or more embodiments, label data 158 may be based on or include correlations of parameters associated with first datum 108 to parameters of user attributes 154. In addition, label data 158 may be at least partially based on earlier iterations of machine-learning processes executed by machine-learning module 130. In some instances, running machine-learning module 130 over multiple iterations refines correlation of parameters or data describing entity operations (e.g., associated with first datum 108) with parameters describing at least user attributes 154.

Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Referring now to FIGS. 2A-2B, exemplary embodiments of user input field 148 as configured to be displayed by GUI 136 of display device 132 based on an interface query data structure are illustrated. As defined earlier, an "interface query data structure" refers to, for example, a data organization format used to digitally request a data result or action on the data (e.g., stored in a database). In one or more embodiments, each output screen 200A-200B may be an example of an output screen configured to be displayed by display device 132 of FIG. 1 by the described interface query data structure. That is, more particularly, the described interface query data structure may configure display device 132 of FIG. 1 to display any one or more of output screens 200A-200B as described in the present disclosure. Accordingly, output screen 200A may include multiple forms of indicia.

In one or more embodiments, output screen 200A and output screen 200B may be examples of user input field 148 and/or GUI 136 as displayed by display device 132, which may be a "smart" phone, such as an iPhone, or other electronic peripheral or interactive cell phone, tablet, etc. Output screen 200A may be a screen initially displayed to a user (e.g., a human or a human representing or acting on behalf of a business or some other entity, and have user engagement area 208 including identification field 204A, client resource data field 212A, prioritization data field 216A, user-input field 220A, which may include one or more instances of user-input datum 224A describing data for selecting a preferred attribute of any one or more repayment behaviors associated with one or more instances of first datum 108.

In addition, in one or more embodiments, user-input datum 224A may be reflective of and/or provide a basis for user attributes 154. Persons skilled in the art, upon reviewing the entirety of this disclosure, will be aware of various ways in which fewer or additional interactive user input fields may be displayed by screen 208A. Identification field 204A may identify described processes performed by processor 144 of computing device 104 by displaying identifying indicia, such as "User Device-Database Interaction Summary" as shown in FIG. 2A to permit, for example, a human to interact with GUI 136 and input information relating to a field of choice (e.g., business operations), through (for example) interactivity provided by identification field 204A.

Such information can include data describing activities performed by the business relating to the business achieving its defined goal (e.g., third datum 112 of FIG. 1). In some instances, a human may select from one or more options (not shown in FIG. 2A) relating to prompts provided by identification field 204A to input such information relating to specific details of, for example, the business. In addition, in some embodiments, any of the described fields may include interactive features, such as prompts, permitting for a human to select additional textual and/or other digital media options further identifying or clarifying the nature of the business relating to the respective specifics of that field. For example, client resource data field 212A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine-learning module 130 and thereby correspondingly appear in the described progression sequence.

Like output screen 200A, output screen 200B may be an example of a screen subsequently shown to a human as described earlier based on human-provided input to any one or more of the displayed fields. That is, output screen 200B may display "Instruction Set for User" in identification field 204B as indicating completion of intake of human-provided input and that described machine-learning processes have completed described classifying processes to output prioritization assessment area 208B to the user. For example, in one or more embodiments, prioritization assessment area 208B may also include multiple human-interactive fields, including threshold identification field 212B, client interaction field 216B, preferred attribute field 220B, and representation display 224B generated as described earlier.

Persons skilled in the art, upon reviewing the entirety of this disclosure, will be aware of various ways in which fewer or additional interactive human input fields may be displayed by output screen 200B. Each field within prioritization assessment area 208B may display any combination of human interactive text and/or digital media, each field intending to provide specific data-driven feedback directed to optimizing ongoing business performance of the business. Various example types of specifics (e.g., "decrease risky leverage in high interest rate conditions") are shown in prioritization assessment area 208B, but persons skilled in the art will be aware of other example types of feedback, each of which being generated as suitable for a given business by processor 144. In addition, in one or more embodiments, any one or more fields of prioritization assessment area 208B may be human-interactive, such as by posing a query for the human to provide feedback in the form of input such that described machine-learning processes performed by machine-learning module 130 may intake refined input data and correspondingly process related data and provide prioritization assessment area 208B. In some embodiments, such processes may be performed iteratively, thereby allowing for ongoing refinement, redirection, and optimization of prioritization assessment area 208B to better meet the needs of the client or user.

Figure 3:
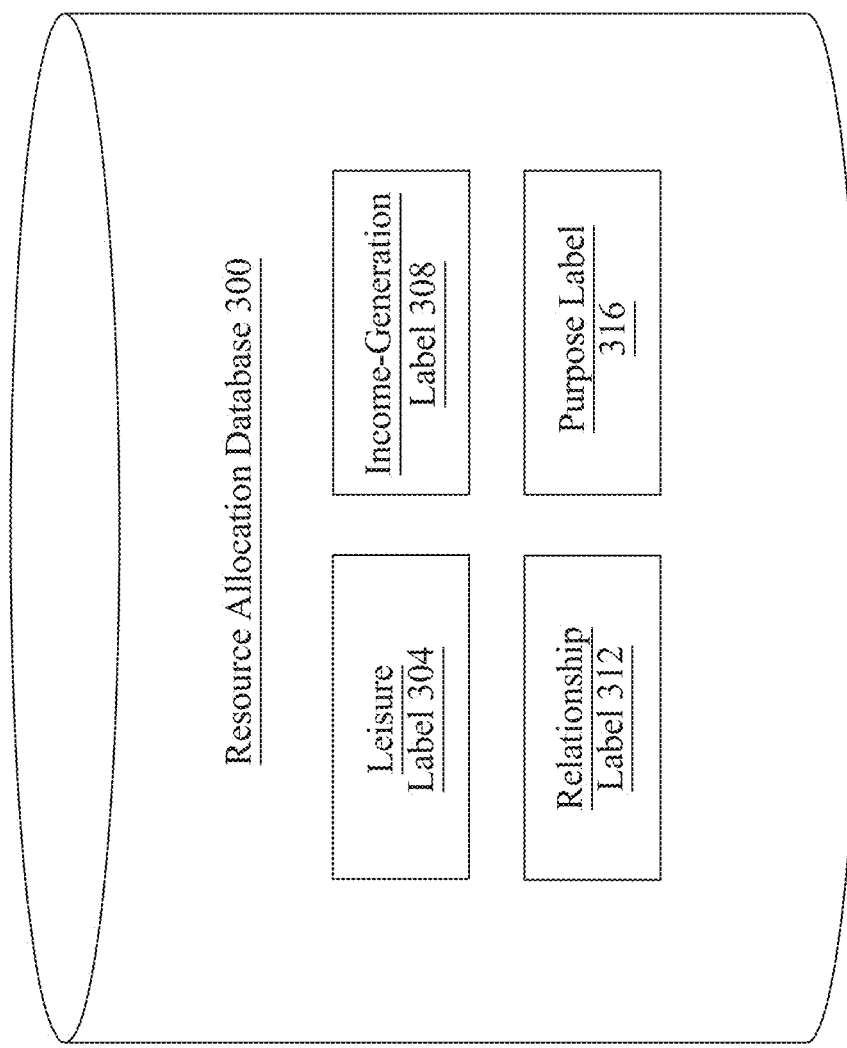
FIG. 3 is a diagrammatic representation of a transfer objective database.

Referring now to FIG. 3, an exemplary embodiment of resource allocation database 300 is illustrated. In one or more embodiments, resource allocation database 300 may be an example of database 150 of FIG. 1. Query database may, as a non-limiting example, organize data stored in the user activity database according to one or more database tables. One or more database tables may be linked to one another by, for instance, common column values. For instance, a common column between two tables of expert database may include an identifier of a query submission, such as a form entry, textual submission, or the like, for instance as defined below; as a result, a query may be able to retrieve all rows from any table pertaining to a given submission or set thereof. Other columns may include any other category usable for organization or subdivision of expert data, including types of query data, identifiers of interface query data structures relating to obtaining information from the user, times of submission, or the like. Persons skilled in the art, upon reviewing the entirety of this disclosure, will be aware of various ways in which user activity data from one or more tables may be linked and/or related to user activity data in one or more other tables.

In addition, in one or more embodiments, computing device 104 may be configured to access and retrieve one or more specific types of user attributes 154 and/or other data types, e.g., one or more instance of first datum 108, second datum 110, third datum 112 and/or third datum 112, as well as representation 120, categorized in multiple tables from resource allocation database 300. For example, as shown in FIG. 3, resource allocation database 300 may be generated with multiple categories including leisure label 304, income-generation label 308, relationship label 312 and purpose label 316. Consequently, the described processes may classify one or more instances of first datum 108 from leisure label 304 to second datum 110 and/or user-input datum 224A that may be input user input field 148 of FIG. 1. In some instances, user-input datum 224A may describe data for selecting a preferred attribute of any one or more skills associated with one or more instances of third datum 112. In addition, described processes may retrieve data describing additional attributes related to the preferred attribute of third datum 112 from resource allocation database 300 connected with the processor based on leisure label 304 (e.g., or, alternatively, one or more of income-generation label 308, relationship label 312, and/or purpose label 316, etc.).

Figure 4:
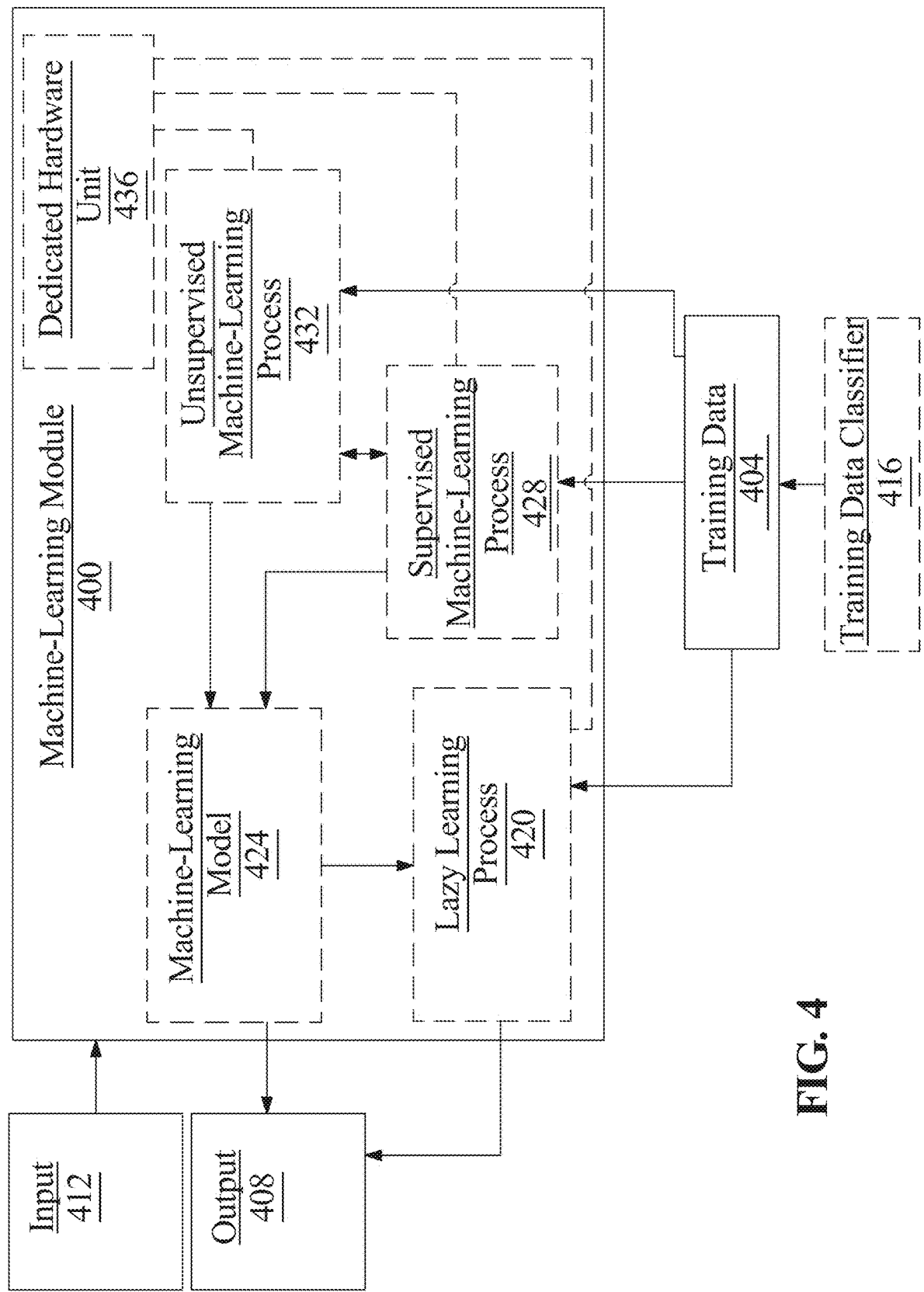
FIG. 4 is a block diagram of exemplary machine-learning processes.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, inputs may include exemplary data pertaining to first datum, second datum and third datum and outputs may include exemplary data pertaining to labels as described above. In another non-limiting example, inputs may include inputs such as user data and outputs may include outputs such as representation in first space as described above. In another non-limiting example, inputs may include one or more instances of any one or more of first datum 108, second datum 110, third datum 112, and/or third datum 112, as well as label data 158 and/or user attributes 154 as described above as inputs, representation display 224B and/or similar textual and/or visual imagery (e.g., digital photos and/or videos) relating to providing representation display 224B to a user as outputs.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to a plurality of labels as described above. labels may include activity patterns as described above, wherein a particular input and output may be classified to a similar label. In some cases, activities within user data may be classified to a label wherein a corresponding output having a similar label may be chosen.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
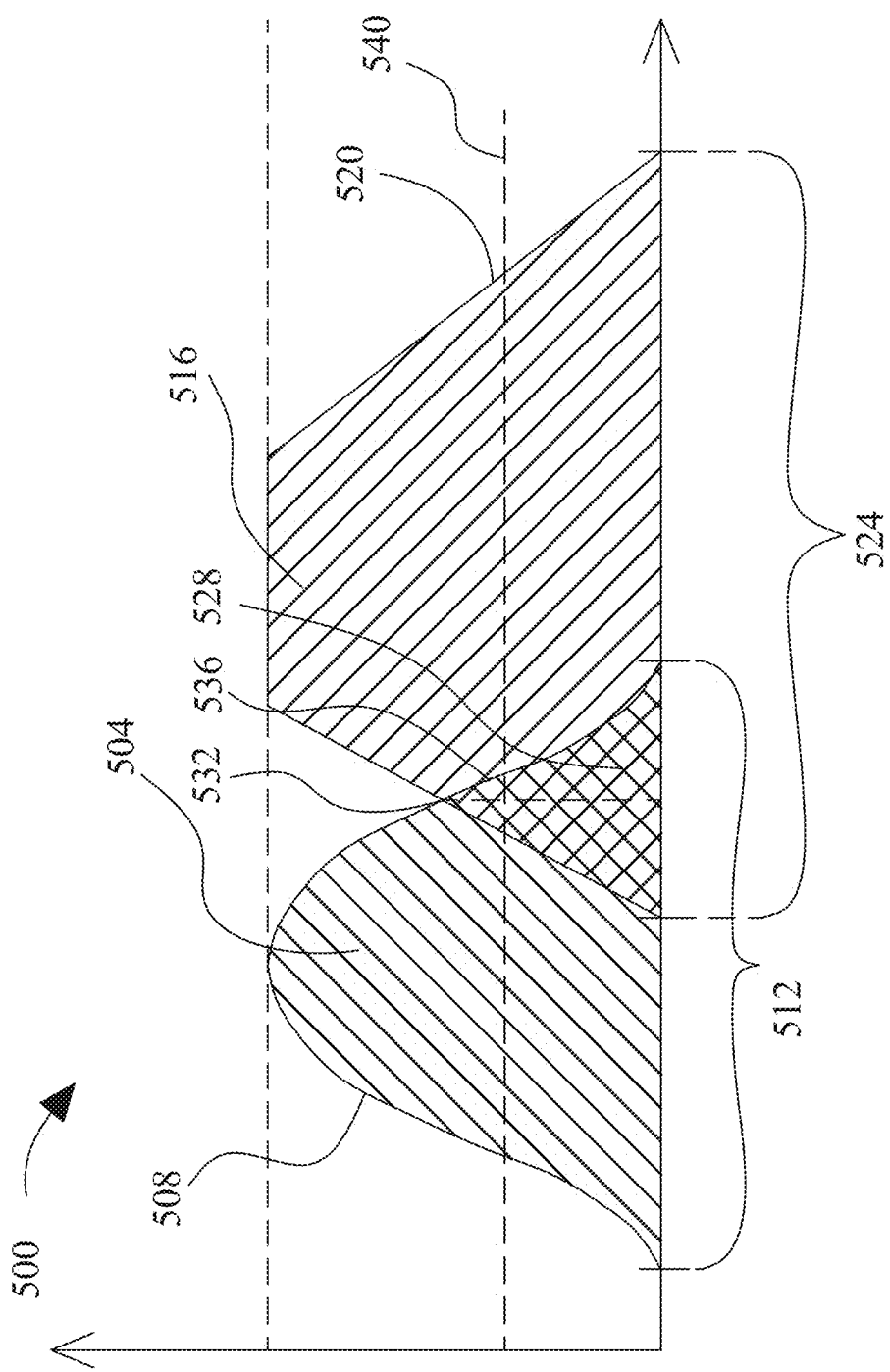
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a skill factor hierarchy to a user as performed by processor 144 of computing device 104 may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, one or more instances of any one or more of first datum 108, second datum 110, third datum 112, and/or third datum 112, as well as label data 158 and/or user attributes 154, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, one or more instances of any one or more of first datum 108, second datum 110, third datum 112, and/or third datum 112, as well as label data 158 and/or user attributes 154, and a predetermined class, such as without limitation, query data or information including interface query data structures stored in resource allocation database 300 of FIG. 3. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models one or more instances of any one or more of first datum 108, second datum 110, third datum 112, and/or third datum 112, as well as label data 158 and/or user attributes 154 and a predetermined class, such as without limitation, query data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify one or more instances of any one or more of first datum 108, second datum 110, third datum 112, and/or third datum 112, to as well as label data 158 and/or user attributes 154 stored in resource allocation database 300. For instance, if first datum 108 and/or interface query data structure 112 has a fuzzy set matching certain interface query data structure data values stored in resource allocation database 300 (e.g., by having a degree of overlap exceeding a threshold), computing device 104 may classify one or more instances of any one or more of first datum 108, second datum 110, third datum 112, and/or third datum 112 as belonging to user attributes 154 (e.g., aspects of user behavior as demonstrated by user attributes 154 of FIG. 1 and/or income-generation label 308 of FIG. 3 relating to user commitment towards achieving third datum 112). Where multiple fuzzy matches are performed, degrees of match for each respective fuzzy set may be computed and aggregated through, for instance, addition, averaging, or the like, to determine an overall degree of match.

Still referring to FIG. 5, in an embodiment, first datum 108 and/or second datum 110 may be compared to multiple resource allocation database 300 categorization fuzzy sets. For instance, first datum 108 and/or second datum 110 may be represented by a fuzzy set that is compared to each of the multiple resource allocation database 300 categorization fuzzy sets; and a degree of overlap exceeding a threshold between the first datum 108 and/or second datum 110 fuzzy set and any of the resource allocation database 300 categorization fuzzy sets may cause computing device 104 to classify one or more instances of any one or more of first datum 108, second datum 110, third datum 112, and/or third datum 112 as belonging to one or more corresponding interface query data structures associated with resource allocation database 300 categorization (e.g., selection from categories in resource allocation database 300, etc.). For instance, in one embodiment there may be two resource allocation database 300 categorization fuzzy sets, representing, respectively, resource allocation database 300 categorization (e.g., into each of leisure label 304, income-generation label 308, relationship label 312, and/or purpose label 316). For example, a First resource allocation database 300 categorization may have a first fuzzy set; a Second resource allocation database 300 categorization may have a second fuzzy set; and one or more instances of any one or more of first datum 108, second datum 110, third datum 112, and/or third datum 112, to as well as label data 158 and/or user attributes 154 may each have a corresponding fuzzy set.

Computing device 104, for example, may compare one or more instances of any one or more of first datum 108, second datum 110, third datum 112, and/or third datum 112, to as well as label data 158 and/or user attributes 154 fuzzy sets with fuzzy set data describing each of the categories included in resource allocation database 300, as described above, and classify one or more instances of any one or more of first datum 108, second datum 110, third datum 112, and/or third datum 112, to as well as label data 158 and/or user attributes 154 to one or more categories (e.g., leisure label 304, income-generation label 308, relationship label 312, and/or purpose label 316). Machine-learning methods as described throughout may, in a non-limiting example, generate coefficients used in fuzzy set equations as described above, such as without limitation x, c, and a of a Gaussian set as described above, as outputs of machine-learning methods. Likewise, any described datum herein may be used indirectly to determine a fuzzy set, as, for example, first datum 108 fuzzy set and/or second datum 110 fuzzy set may be derived from outputs of one or more machine-learning models that take first datum 108 and/or second datum 110 directly or indirectly as inputs.

Still referring to FIG. 5, a computing device may use a logic comparison program, such as, but not limited to, a fuzzy logic model to determine a resource allocation database 300 response. A resource allocation database 300 response may include, but is not limited to, accessing and/or otherwise communicating with any one or more of leisure label 304, income-generation label 308, relationship label 312, purpose label 316, and the like; each such resource allocation database 300 response may be represented as a value for a linguistic variable representing resource allocation database 300 response or in other words a fuzzy set as described above that corresponds to a degree of matching between data describing first datum 108 and/or second datum 110 and one or more categories within resource allocation database 300 as calculated using any statistical, machine-learning, or other method that may occur to a person skilled in the art upon reviewing the entirety of this disclosure.

In some embodiments, determining a resource allocation database 300 categorization may include using a linear regression model. A linear regression model may include a machine-learning model. A linear regression model may be configured to map data of first datum 108 and/or second datum 110, to one or more resource allocation database 300 parameters. A linear regression model may be trained using a machine-learning process. A linear regression model may map statistics such as, but not limited to, quality of first datum 108 and/or second datum 110. In some embodiments, determining resource allocation database 300 of first datum 108 and/or second datum 110 may include using a resource allocation database 300 classification model. A resource allocation database 300 classification model may be configured to input collected data and cluster data to a centroid based on, but not limited to, frequency of appearance, linguistic indicators of quality, and the like. Centroids may include scores assigned to them such that quality of first datum 108 and/or second datum 110 may each be assigned a score.

In some embodiments, resource allocation database 300 classification model may include a K-means clustering model. In some embodiments, resource allocation database 300 classification model may include a particle swarm optimization model. In some embodiments, determining the resource allocation database 300 of first datum 108 and/or second datum 110 may include using a fuzzy inference engine (e.g., to assess the progress of the user and use said data to amend or generate new strategies based on user progress). A fuzzy inference engine may be configured to map one or more instances of any one or more of first datum 108, second datum 110, third datum 112, and/or third datum 112, to as well as label data 158 and/or user attributes 154 data elements using fuzzy logic. In some embodiments, described data may be arranged by a logic comparison program into resource allocation database 300 arrangement. A "resource allocation database 300 arrangement" as used in this disclosure is any grouping of objects and/or data based on similarity to each other and/or relation to providing representation display 224B of FIG. 2B to the user for the user to achieve. This step may be implemented as described above in FIG. 1.

Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to first datum 108 and/or second datum 110, such as a degree of matching between data describing user aspirations and strategies based on responses to interface query data structures stored in resource allocation database 300. Continuing the example, an output linguistic variable may represent, without limitation, a score value. An inference engine may combine rules, such as: "if the demonstrated commitment level of a person or business falls beneath a threshold," and "the observed performance of the person or business relative to their or its peers is deficient," the commitment score is 'deficient'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
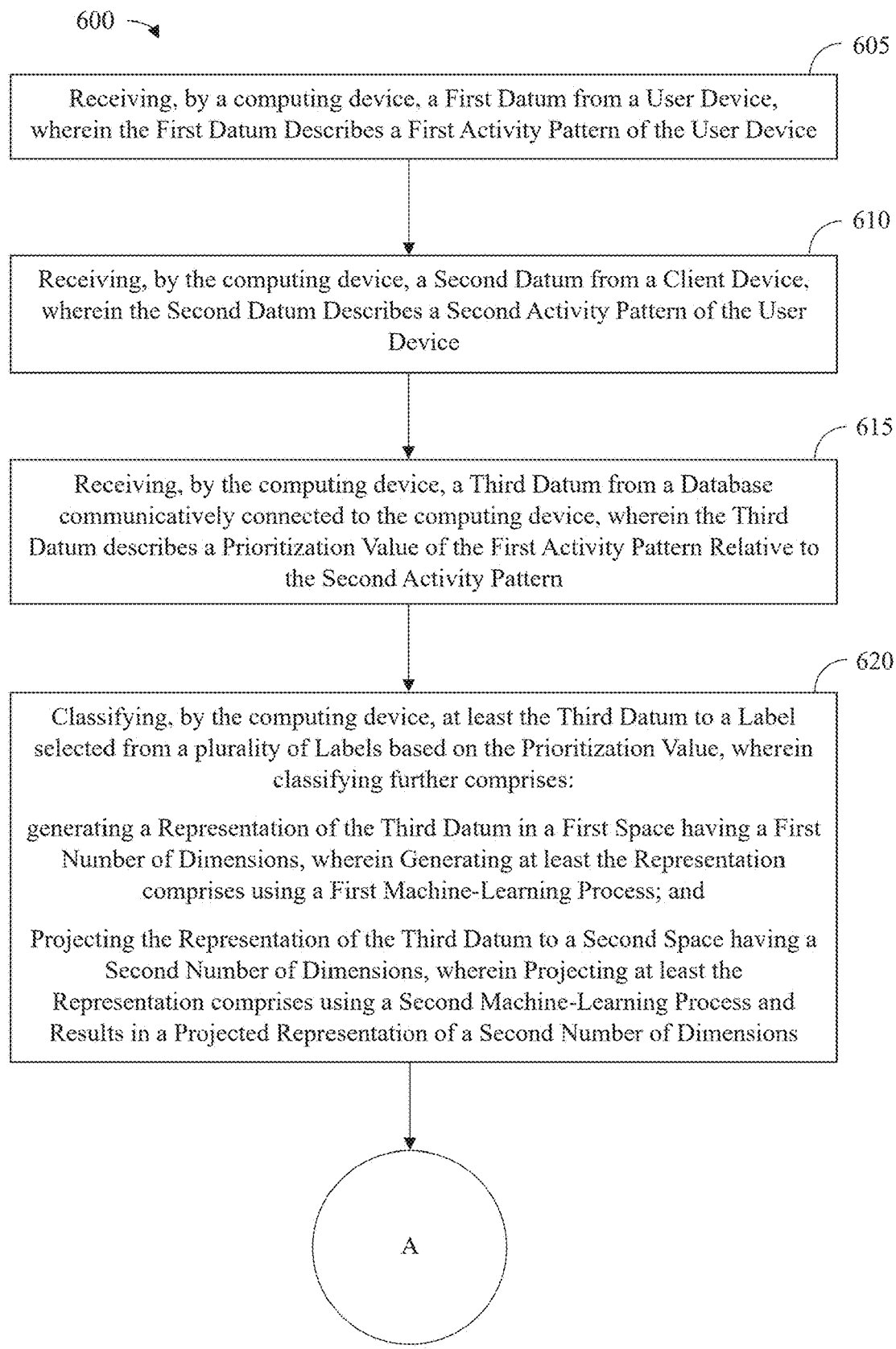
FIG. 6 is a flow diagram of an exemplary method for predicting a resource growth pattern.
Figure 6:
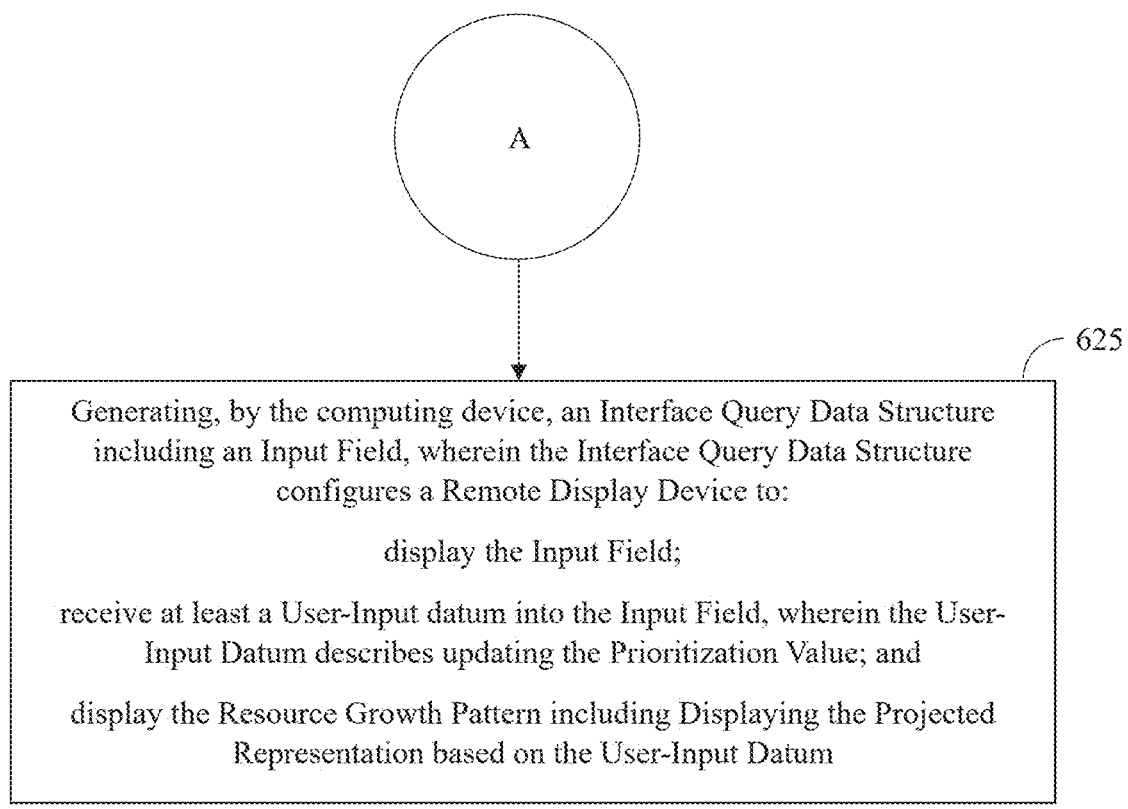

Now referring to FIG. 6, method 600 for determining a resource growth pattern is described. At step 605, method 600 includes receiving, by a computing device, a first datum from a user device, wherein the first datum describes a first activity pattern of the user device. This step may be implemented as described above, without limitation, in FIGS. 1-7.

Still referring to FIG. 6, at step 610, method 600 includes receiving, by the computing device, a second datum from a client device, wherein the second datum describes a second activity pattern of the user device. This step may be implemented as described above, without limitation, in FIGS. 1-7.

Still referring to FIG. 6, at step 615, method 600 includes receiving, by the computing device, a third datum from a database communicatively connected to the computing device, wherein the third datum describes a prioritization value of the first activity pattern relative to the second activity pattern. This step may be implemented as described above, without limitation, in FIGS. 1-7.

Still referring to FIG. 6, at step 620, method 600 includes classifying, by the computing device, at least the third datum to a label selected from a plurality of labels based on the prioritization value, where classifying further comprises generating a representation of the third datum in a first space having a first number of dimensions, where generating at least the representation comprises using a first machine-learning process, and projecting the representation of the third datum to a second space having a second number of dimensions, wherein projecting at least the representation comprises using a second machine-learning process and results in a projected representation of a second number of dimensions. This step may be implemented as described above, without limitation, in FIGS. 1-7.

Still referring to FIG. 6, at step 625, method 600 includes generating, by the computing device, an interface query data structure including an input field, where the interface query data structure configures a remote display device to display the input field, receive at least a user-input datum into the input field, wherein the user-input datum describes updating the prioritization value, and display the resource growth pattern including displaying the object sequence based on the user-input datum. This step may be implemented as described above, without limitation, in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM"

device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
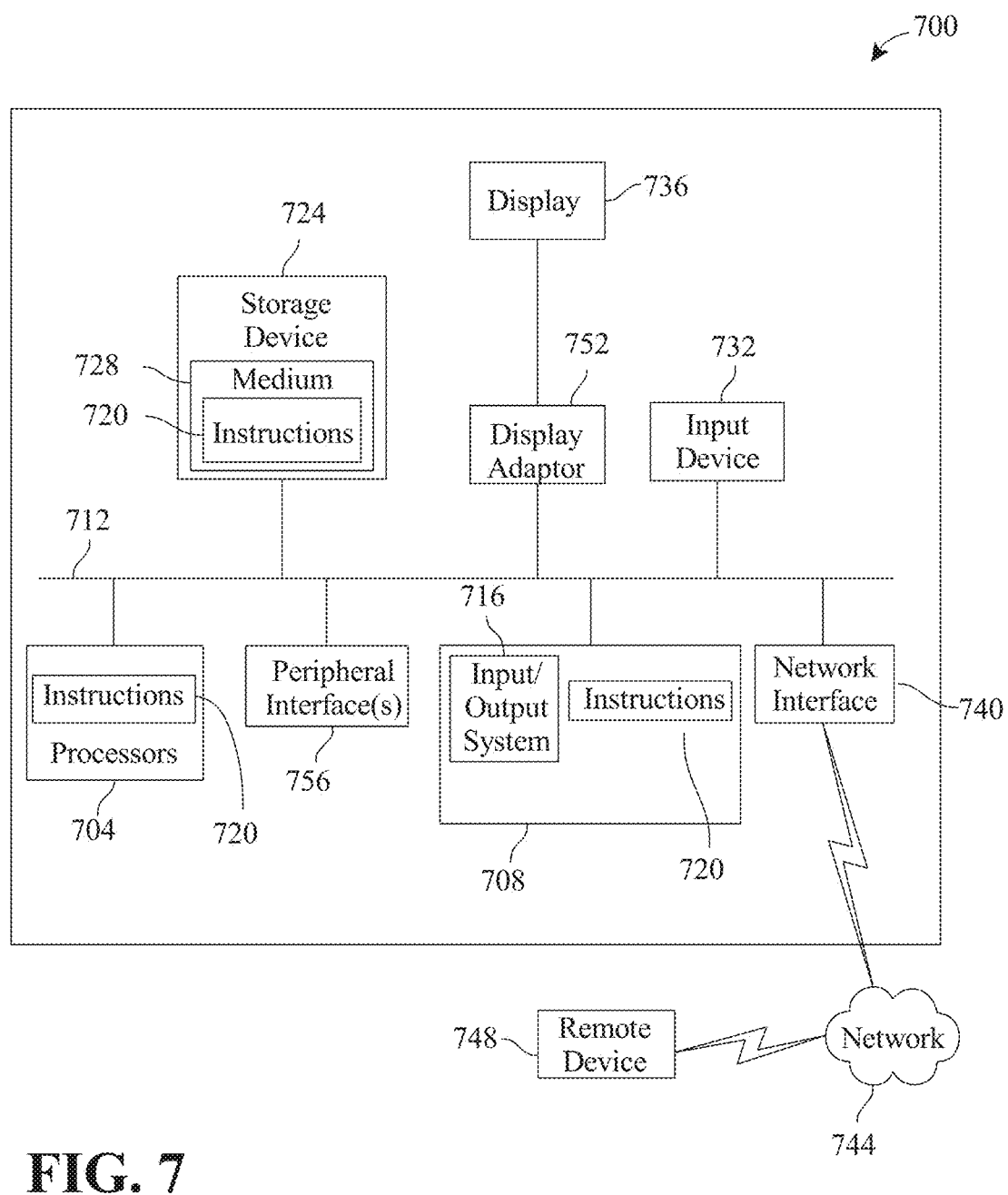
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Video display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for predicting a resource growth pattern, the apparatus comprising:
    at least a processor;
    a memory connected to the at least a processor, the memory containing instructions configuring the at least a processor to:
        receive a first datum from a user device, wherein the first datum describes a first activity pattern of the user device;
        receive a second datum from a client device, wherein the second datum describes a second activity pattern of the user device;
        retrieve a third datum, wherein the third datum describes a prioritization value of the first activity pattern relative to the second activity pattern;
        classify the third datum to a label selected from a plurality of labels based on the prioritization value, wherein classifying the third datum further comprises:
            generating a representation of the third datum in a first space having a first number of dimensions, wherein generating the representation comprises using a first machine-learning process comprising a representation machine-learning model and further comprising:
                receiving representation training data, wherein the representation training data comprises:
                    applying an input layer of nodes comprising a plurality of user data, one or more intermediate layers of nodes, and an output layer of nodes comprising a plurality of first space data;
                    adjusting one or more connections and one or more weights between nodes in adjacent layers of the representation machine-learning model;
                    detecting correlations between the output layer of nodes and the input layer of nodes;
                training, iteratively, the representation machine-learning model using the representation training data, wherein training the representation machine-learning model includes retraining the representation machine-learning model using a simulated annealing algorithm, the detected correlations between the output layer of nodes and the input layer of nodes, and user inputs indicating a sub-optimal performance received by the at least processor by performing an auditing process configured to compare outputs of the representation machine-learning model to a convergence test to reconfigure a network of nodes; and
                generating the representation of the third datum using the trained representation machine-learning model; and
            projecting the representation of the third datum generated by the trained representation machine-learning model to a second space having a second number of dimensions, wherein projecting the representation comprises using a second machine-learning process and results in a projected representation of a second number of dimensions; and
        generate an interface query data structure, wherein the interface query data structure configures a remote display device to:
            display an input field;
            receive at least a user-input datum into the input field, wherein the user-input datum describes updating the prioritization value; and
            display a resource growth pattern including displaying the representation based on the user-input datum.

2. The apparatus of claim 1, wherein generating the interface query data structure further comprises:
    retrieving data describing attributes of a user from a database communicatively connected to the at least a processor;
    displaying a representation of at least a first label and a second label selected from a plurality of labels in a grid; and
    generating the interface query data structure based on the data describing attributes of the user, wherein generating the interface query data structure further comprises:

determining at least a vector from the representation of the at least a first label to the second label; and
configuring the remote display device to display the at least a vector.

3. The apparatus of claim 2, wherein determining the at least a vector from the at least a first label to the second label further comprises generating the vector including an angle value and a distance value, wherein the angle value and the distance value describe at least a divergence value between the first datum and the second datum.

4. The apparatus of claim 1, wherein generating the third datum further comprises retrieving data describing current preferences of the user device between a minimum value and a maximum value from a database communicatively connected to the at least a processor, wherein retrieving the data further comprises receiving at least a form element input into the input field.

5. The apparatus of claim 1, further comprising generating at least an additional input field based on a divergence value that describes divergence between the first datum and the second datum.

6. The apparatus of claim 1, further comprising:
classifying at least an instance of the first datum to the third datum;
determining a proximity of the at least an instance of the first datum to the third datum based on the first activity pattern; and
adjusting the third datum to reduce the proximity.

7. The apparatus of claim 1, further comprising:
classifying the second datum to the third datum, wherein classifying the second datum further comprises comparing the second datum to the third datum; and
determining a parity value based on comparison of the second datum to the third datum, wherein the parity value is included within the resource growth pattern.

8. The apparatus of claim 5, further comprising:
determining a pattern, wherein the pattern describes a user interaction;
classifying at least an element of the pattern to the divergence value; and
adjusting the pattern based on a magnitude of the divergence value.

9. The apparatus of claim 1, further configured to evaluate the user-input datum comprising:
classifying one or more new instances of the user-input datum to the third datum;
generating at least a divergence value based on the classification; and
displaying the at least a divergence value hierarchically based on magnitude of divergence.

10. The apparatus of claim 1, wherein classifying the third datum to the label further comprises:
organizing at least some labels based on their respective proximity to a minimal output type and a maximum output type;
aggregating at least an instance of the first datum based on the classification; and
classifying aggregated first data to the label having a closest proximity to the maximum output type.

11. A method for predicting a resource growth pattern, the method comprising:
receiving, by a computing device, a first datum from a user device, wherein the first datum describes a first activity pattern of the user device;
receiving, by the computing device, a second datum from a client device, wherein the second datum describes a second activity pattern of the user device;
receiving, by the computing device, a third datum from a database communicatively connected to the computing device, wherein the third datum describes a prioritization value of the first activity pattern relative to the second activity pattern;
classifying, by the computing device, at least the third datum to a label selected from a plurality of labels based on the prioritization value, wherein classifying the third datum further comprises:
generating a representation of the third datum in a first space having a first number of dimensions, wherein generating the representation comprises using a first machine-learning process comprising a representation machine-learning model and further comprising:
receiving representation training data, wherein the representation training data comprises:
applying an input layer of nodes comprising a plurality of user data, one or more intermediate layers of nodes, and an output layer of nodes comprising a plurality of first space data;
adjusting one or more connections and one or more weights between nodes in adjacent layers of the representation machine-learning model;
detecting correlations between the output layer of nodes and the input layer of nodes;
training, iteratively, the representation machine-learning model using the representation training data, wherein training the representation machine-learning model includes retraining the representation machine-learning model using a simulated annealing algorithm, the detected correlations between the output layer of nodes and the input layer of nodes, and user inputs indicating a sub-optimal performance received by the computing device by performing an auditing process configured to compare outputs of the representation machine-learning model to a convergence test to reconfigure a network of nodes; and
generating the representation of the third datum using the trained representation machine-learning model; and
projecting the representation of the third datum generated by the trained representation machine-learning model to a second space having a second number of dimensions, wherein projecting the representation comprises using a second machine-learning process and results in a projected representation of a second number of dimensions; and
generating, by the computing device, an interface query data structure including an input field, wherein the interface query data structure configures a remote display device to:
display the input field;
receive at least a user-input datum into the input field, wherein the user-input datum describes updating the prioritization value; and
display the resource growth pattern including displaying the representation based on the user-input datum.

12. The method of claim 11, wherein generating the interface query data structure further comprises:
retrieving data describing attributes of a user from a database communicatively connected to the computing device;
displaying a representation of at least a first label and a second label selected from a plurality of labels in a grid;
generating the interface query data structure based on the data describing attributes of the user, wherein generating the interface query data structure further comprises:

determining at least a vector from the representation of at least the first label to the second label; and configuring the remote display device to display the vector.

13. The method of claim 12, wherein determining the at least the vector from at least the first label to the second label further comprises generating the vector including an angle value and a distance value, wherein:

the angle value and the distance value describe at least a divergence value between the first datum and the second datum.

14. The method of claim 11, wherein generating the third datum further comprises:

retrieving data describing current preferences of the user device between a minimum value and a maximum value from a database communicatively connected to the computing device, wherein retrieving the data further comprises receiving at least a form element input into the input field.

15. The method of claim 11, further comprising generating at least an additional input field based on a divergence value, which describes divergence between the first datum and the second datum.

16. The method of claim 11, further comprising:

classifying at least an instance of the first datum to the third datum;

determining a proximity of a respective first datum to the third datum based on the first activity pattern; and adjusting the third datum to reduce the proximity.

17. The method of claim 11, further comprising:

classifying the second datum to the third datum, wherein classifying the second datum further comprises:

comparing the second datum to the third datum; and determining a parity value based on comparison of the second datum to the third datum, wherein the parity value is included within the resource growth pattern.

18. The method of claim 15, further comprising:

determining a pattern, wherein the pattern describes user interaction with the database;

classifying at least an element of the pattern to the divergence value; and adjusting the pattern based on a magnitude of the divergence value.

19. The method of claim 11, further configured to evaluate the user-input datum comprising:

classifying one or more new instances of the user-input datum to at least the third datum;

generating at least a divergence value based on the classification; and displaying the at least a divergence value hierarchically based on magnitude of divergence.

20. The method of claim 11, wherein classifying the third datum to the label further comprises:

organizing at least some labels based on their respective proximity to a minimal output type and a maximum output type;

aggregating at least an instance of the first datum based on the classification; and classifying aggregated first data to the label having a closest proximity to the maximum output type.

* * * * *